Figure 1:
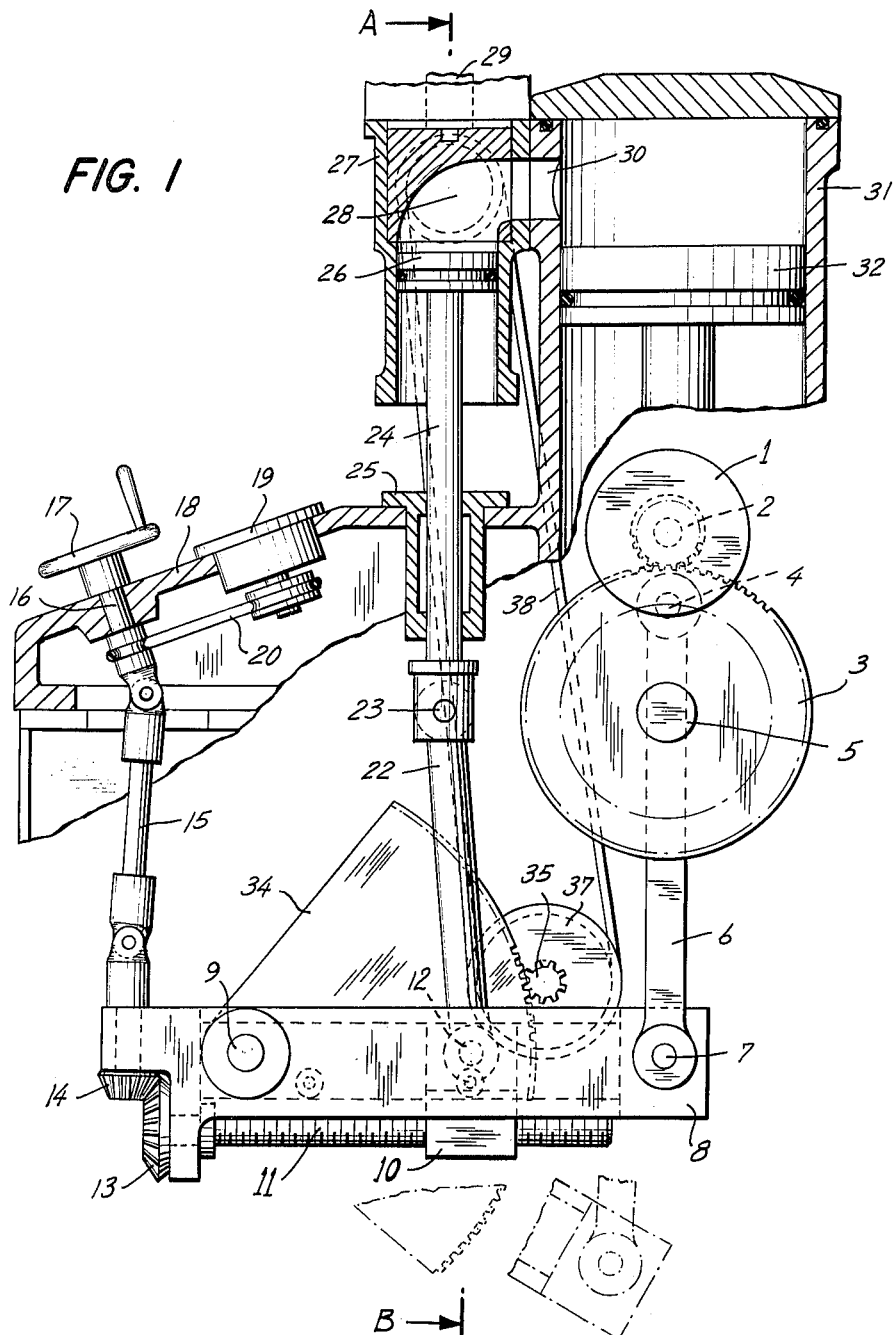

March 8, 1966  J. MÜLLER  3,238,559
SAUSAGE STUFFING MACHINE
Filed April 13, 1964  2 Sheets-Sheet 1

INVENTOR:
JOHANN MÜLLER
BY Michael S. Striker
his ATTORNEY

INVENTOR:
JOHANN MÜLLER
BY Michael S. Striker
his ATTORNEY

United States Patent Office

3,238,559
Patented Mar. 8, 1966

3,238,559
SAUSAGE STUFFING MACHINE
Johann Müller, Rammingerstrasse 2, Biberach
(Riss), Germany
Filed Apr. 13, 1964, Ser. No. 359,522
19 Claims. (Cl. 17—39)

The present invention relates to sausage stuffing machines in general, and more particularly to improvements in the construction, mounting and adjustment of the assembly which feeds measured quantities of comminuted meat or similar pasty material into animal or artificial skins to form sausages of predetermined shape and/or weight. Still more particularly, the invention relates to an improved mechanism which serves to reciprocate and to adjust the stroke of a feed piston whose function is to draw pasty material into a feed cylindrical and to thereupon expel measured quantities of such material through a spout or a similar tubular conveying member and into the interior of a skin which is placed onto the conveying member so that the material will draw the skin off the conveying member during each working stroke of the feed piston.

In many conventional sausage stuffing machines of which I have knowledge at this time, the feed piston is reciprocated by a crank mechanism and, when the operator desires to change the stroke of the feed piston, he must change the throw of the crank pin so that the feed piston will cover a longer or a shorter distance at the time it travels between two end positions. A serious drawback of such crank mechanisms is that, whenever the operator wishes to change the volume or weight of a batch of pasty material which is to form a sausage, both end positions of the feed piston will change which means that a mass of pasty material will remain in the feed cylinder whenever the stroke of the feed piston is shortened. In other words, and when the feed piston completes a working stroke during which a measured quantity of pasty material was expelled from the feed cylinder, some material will remain in the feed cylinder excepting when the crank mechanism is adjusted in a sense to compel the piston to perform working and return strokes of maximum length. The material of a sausage is highly compressible so that the mass which remains in the feed cylinder affects the volume of the batch which is expelled from the feed cylinder whereby the machine produces sausages of unequal weight. Furthermore, the material which is entrapped in the feed cylinder is likely to become spoiled and to contaminate the batches which are expelled into the skin so that the feed cylinder must be cleaned at frequent intervals. If the machine is not provided with a mechanism which adjusts the stroke of the feed piston, its utility is reduced considerably because the machine is only capable of making sausages of a given weight but cannot be converted for the production of heavier or lighter products.

Accordingly, it is an important object of my invention to provide an improved adjusting mechanism which is capable of regulating the stroke of the feed piston in a sausage stuffing machine in such a way that the piston will always evacuate the feed cylinder when it performs a working stroke and that the stroke of the feed piston may be varied within a wide range without affecting the operation of the machine in which the feed piston is used.

Another object of the invention is to provide a novel mechanism for reciprocating the feed piston of a sausage stuffing machine and to construct the reciprocating mechanism in such a way that the position of the feed piston at the end of its working stroke will not change even though the length of the strokes may be varied so that the feed piston may be utilized in the manufacture of heavier or lighter sausages.

A further object of the invention is to provide a sausage stuffing machine which embodies a reciprocating mechanism of the above outlined characteristics and which is capable of automatically indicating the length of strokes which the feed piston performs at any given stage of the operation.

An additional object of my invention is to provide a sausage stuffing and linking machine wherein the linking mechanism is driven automatically at required intervals in responsse to reciprocation of the feed piston.

A concomitant object of the invention is to provide a machine of the just outlined characteristics wherein the operative connection between the mechanism which reciprocates the feed piston and the mechanism which forms links at the trailing ends of freshly formed sausages is constructed in such a way that the skin is always twisted in the same direction so that the possibility of untwisting the link at the leading end of a freshly formed sausage while the machine forms a link at the trailing end of the same sausage is avoided in a fully automatic way.

Another object of the invention is to provide a novel transmission which is capable of twisting the skin at the trailing end of a freshly formed sausage in a fully automatic way when the piston performs a return stroke so that the linking operation begins only at the time the skin has received an accurately measured quantity of comminuted meat or similar pasty material.

A further object of the invention is to provide a sausage stuffing and linking machine which is of very compact design, which will produce sausages of uniform size and weight, which is capable of stuffing and linking an artificial or animal skin in a fully automatic way, and wherein a single prime mover suffices to drive the feed piston and the linking mechanism.

With the above objects in view, my invention resides in the provision of a sausage stuffing machine which comprises a feed piston including a piston rod and serving to feed measured quantities of comminuted meat or similar pasty material into a skin so that each measured quantity of such material will constitute the filling of a fresh sausage, and reciprocating means for moving the piston between two end positions so that the piston alternatively performs working and return strokes. In accordance with one feature of my invention, the reciprocating means comprises a fixed shaft which is preferably perpendicular to the axis of the piston, a carriage arranged to rock about the axis of the fixed shaft, rocking means for moving the carriage back and forth through equal distances and including an eccentric coupling rod which is driven by a motor and is articulately connected to the carriage by a pivot which is spaced from and parallel with the fixed shaft, and connecting means for adjustably coupling the piston rod to the carriage so that the piston reciprocates in response to rocking of the carriage. The connecting means comprises a spindle nut or an analogous adjusting member supported by the carriage and operatively connected with the piston rod (for example, by a push rod), and this adjusting member is controlled by a spindle or a similar shifting device which serves to move the adjusting member betwen the pivot and the fixed shaft whereby the stroke of the piston increases in response to increasing distance between the adjusting member and the fixed shaft.

In accordance with a preferred embodiment of my invention, the axes of the fixed shaft and of the pivot for the coupling rod are located in a comon plane which is substantially perpendicular to the axis of the feed piston when the latter reaches the end of its working stroke whereby the position of the feed piston at the end of the working stroke remains unchanged even though the length of the strokes may be adjusted between zero and a maximum value. In other words, when the operator decides to change the length of strokes, the position of the piston will change at the end of its return stroke but not at the end of the working stroke.

Figure 2:
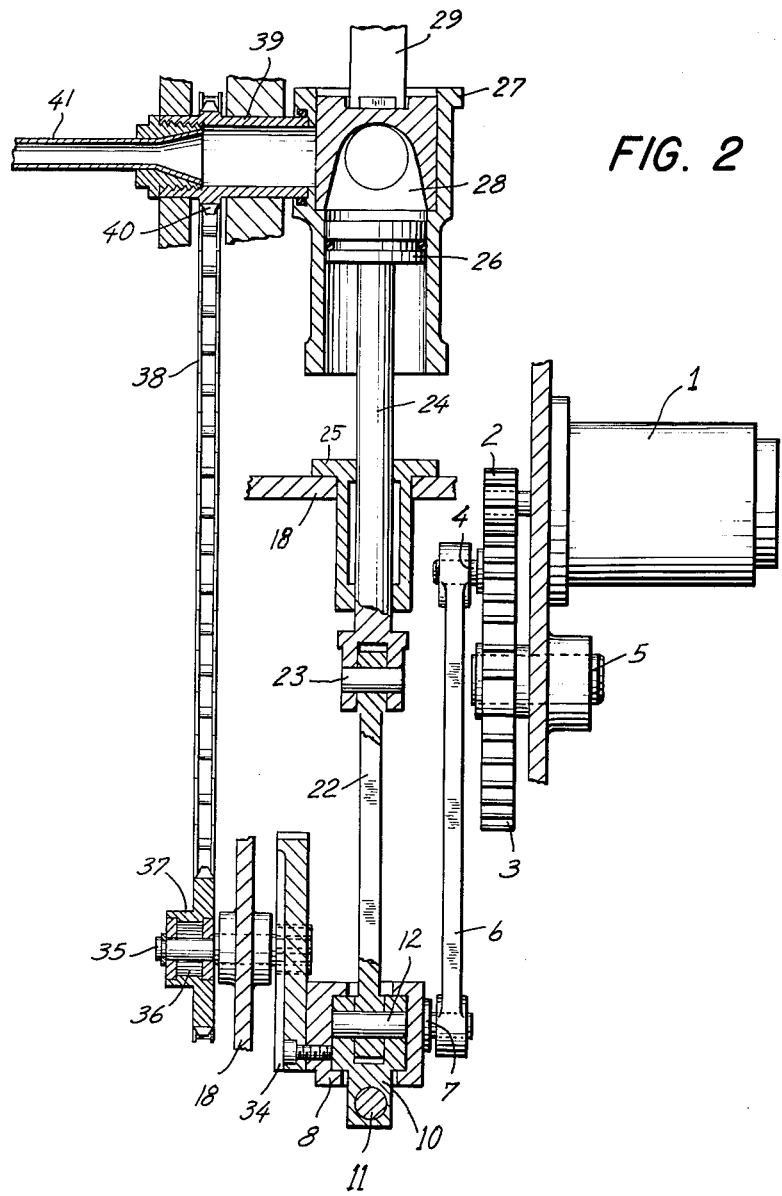

The novel features which are considered as characteristic of the invention are set forth in particular in the appended claims. The improved machine itself, however, both as to its construction and the mode of operating and adjusting the same, together with additional features and advantages thereof, will be best understood upon perusal of the following detailed description of a specific embodiment with reference to the accompanying drawings, in which:

FIG. 1 is a partly elevational and partly sectional view of a portion of a sausage stuffing machine which embodies my invention; and FIG. 2 is a section as seen in the direction of arrows from the line A–B of FIG. 1.

Referring to the drawings, there is shown a portion of a sausage stuffing and linking machine which comprises a housing or casing 18 supporting a variable-speed electric motor 1 whose output shaft carries a pinion 2 meshing with a gear 3 which is rotatable about a shaft 5 fixed to the housing 18. The gear 3 carries an eccentric pin 4 which is connected to one end of an eccentric coupling rod 6. The other end of the rod 6 is connected to a pivot 7 provided at one end of a rockable carriage 8 which is mounted on a fixed shaft 9 secured to the housing 18. The axis of the shaft 9 is parallel with and is spaced from the axis of the pivot 7.

The metering mechanism which delivers measured quantities of comminuted meat or similar pasty material into a tubular conveying spout 41 comprises a feed cylinder 27 which accommodates a feed piston 26. The rod 24 of the feed piston 26 is guided by a sleeve 25 which is detachably secured to the housing 18, and the lower end of the piston rod 24 is connected to a pin 23 provided at the upper end of a push rod 22. The lower end of this push rod 22 is articulately secured to a spindle nut 10 by means of a pin 12. The nut 10 constitutes an adjusting member which serves to vary the stroke of the feed piston 26 and is movable in the axial direction of a shifting member here shown as a self-locking threaded spindle 11 which is rotatably mounted on the carriage 8 to extend radially of the fixed shaft 9 and which may be rotated by an actuating device, here shown as a handwheel 17, through a transmision including a shaft 16 which is rotatable in the housing 18 and which may rotate the spindle 11 through a pair of mating bevel gears 13, 14 and a shaft 15. The shaft 15 is axially movably but non-rotatably received between two bearing sleeves respectively connected with the shaft 16 and bevel gear 14. When the operator rotates the handwheel 17, the spindle nut 10 will travel along the revolving spindle 11 and will adjust the stroke of the feed piston 26. The stroke of this feed piston will increase if the handwheel 17 is rotated in a sense to move the spindle nut 10 in a direction away from the fixed shaft 9, i.e., toward the pivot 7. On movement of the spindle nut 10 toward the fixed shaft 9, the stroke of the feed piston 26 is reduced and is zero when the axis of the pin 12 coincides with the axis of the fixed shaft 9. It will be noted that the parts 1–10, 12 and 22–24 constitute a reciprocating means for moving the feed piston 26 with reference to the feed cylinder 27 so that the piston moves between two end positions and alternatively performs working and return strokes, and that the parts 10, 12 and 22–23 constitute connecting means for adjustably coupling the piston rod 24 with the carriage 8 so that the feed piston 26 reciprocates in response to rocking of the carriage by the rocking means 1–7. The stroke of the piston 26 may be adjusted by the shifting means 11, 13–17, and such adjustments may be effected while the piston 26 reciprocates. The ratio of the transmission 13–15 between the shaft 16 and spindle 11 is such that the strokes of the piston 26 may be adjusted with utmost precision in response to rotation of the handwheel 17. The bevel gears 13, 14 prevent any uncontrolled rotation of the spindle 11 so that the nut is automatically locked in any selected position of adjustment when the handwheel 17 is released.

As shown in FIG. 2, the carriage 8 defines a guideway or channel in which the spindle nut 10 may reciprocate in response to rotation of the spindle 11. The push rod 22 extends through a slot provided in the top wall of the carriage 8.

An important advantage of the adjusting mechanism including the nut 10 and spindle 11 is that the upper end position of the piston 26 changes very little or does not change at all in response to adjustments in the position of the nut 10. This will be readily understood since, when the nut 10 is caused to move toward or away from the fixed shaft 9, the corresponding axial displacement of the piston 26 is much shorter so that the upper end position of this piston is substantially unchanged. When the carriage 8 is rocked to the upper end position of FIG. 1, the axis of the spindle 11 is subsantially perpendicular to the axis of the piston rod 24 and, therefore, the stroke of the piston 26 is determined mainly by the lower end position of this piston which position is controlled by adjustment of the spindle nut 10. In other words, when the piston 26 completes a working (upward) stroke, the plane common to the axes of fixed shaft 9 and pivot 7 is substantially perpendicular to the axis of the piston rod 24 and piston 26. This plane passes through or is parallel with the axis of the spindle 11. Consequently, the piston 26 will always reach the same level when it moves to its upper end position and may expel all pasty material which was sucked into the feed cylinder during the preceding return stroke. This is a decided advantage for reasons which were explained hereinbefore, i.e., the batches of pasty material will be compressed to the same extent and the feed cylinder 27 cannot retain pasty material which could become spoiled to affect the quality of the mass which enters the skin.

The shaft 16 of the handwheel 17 is coupled to an adjustable indicator device 19 by a belt transmission 20, and the scale of the device 19 is calibrated in such a way that its pointer indicates the weight or the volume of the batch of comminuted material which is expelled from the feed cylinder 27 in response to each upward (working) stroke of the feed piston 26. In other words, the device 19 indicates, directly or indirectly and in a fully automatic way, the length of strokes performed by the feed piston 26 in any given position of the spindle nut 10.

The distance between the pins 12, 23 (the effective length of the push rod 22) equals or exceeds the distances through which the nut 10 may be moved toward or away from the fixed shaft 9. In other words, the effective length of the push rod 22 is selected in such a way that it at least equals the effective length of the spindle 11. The axis of the pin 12 is located in a plane which is common to the axes of the fixed shaft 9 and pivot 7 and the axis of the pin 12 remains in this plane when the nut 10 is moved with reference to the carriage 8.

The feed cylinder 27 comprises an upwardly projecting extension which accommodates a conventional control valve 28 serving to connect the chamber of the cylinder 27 with a source of pasty material, here shown as a supply cylinder 31, or with the spout 41, depending upon whether the feed piston 26 respectively performs a return (suction) stroke (downwardly, as viewed in FIG. 1) or a working stroke. The valve 28 is moved by a control shaft 29 which is driven in synchronism with the feed piston 26 so that the latter may draw pasty material from the supply cylinder 31 (through an opening 30) when it performs a return stroke and that a measured quantity of such pasty material will be expelled through a rotary nozzle 39 and into the spout 41 when the piston 26 performs a working stroke (upwardly, as viewed in FIG. 1 or 2). The cylinder 31 accommodates a supply piston 23 which draws comminuted meat from a suitable tank or the like, not shown. The control valve 28 is rotated back and forth through 90 degrees so that the opening 30 alternatively communicates with the supply cylinder 31 and nozzle 39.

The spout 41 serves to support a skin (not shown) and to twist the skin upon delivery of a measured quantity of pasty material so that the skin forms a link which separates the freshly formed sausage from the remainder of the skin. The linking mechanism of my machine preferably corresponds to that disclosed in my copending application Serial No. 129,489 which issued on July 14, 1964 as Patent 3,140,509, and to which reference may be had if necessary. Since the spout 41 must be rotated in synchronism with the operation of the feed piston 26, I provide a one-way transmission which causes the nozzle 39 to rotate at predetermined intervals. This transmission comprises a toothed segment 34 which is bolted to the carriage 8 and whose teeth mesh with the teeth of a small pinion mounted on a shaft 35 which is journalled in the housing 18. The shaft 35 drives a sprocket wheel 37 through a one-way clutch 36, and this wheel drives a second sprocket wheel 40 through an endless chain 38. The sprocket wheel 40 is mounted on the nozzle 39 which is rotatable in the housing 18 and is detachably but non-rotatably connected with the spout 41.

The one-way clutch 36 insures that the spout 41 cannot rotate back and forth, i.e., the shaft 35 is free to rotate with reference to the sprocket wheel 37 when the feed piston 26 performs a working stroke, but the spout 41 will be caused to rotate and to form a link at the trailing end of a fresh sausage when the feed piston performs a return stroke. In this manner, the skin which is mounted on the spout 41 is ready to receive a new fresh batch of pasty material when the feed piston 26 performs the next working stroke. The center of curvature of the pitch circle of the segment 34 is located on the axis of the fixed shaft 9. If desired, the one-way clutch 36 may be placed between the nozzle 39 and sprocket wheel 40.

The batches of pasty material cause predetermined lengths of skin to slide off the spout 41 in a manner substantially as disclosed in my aforementioned application Serial No. 129,489.

Without further analysis, the foregoing will so fully reveal the gist of the present invention that others can, by applying current knowledge, readily adapt it for various applictions without omitting features which fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In a sausage stuffing machine of the type including primary supply means and a feed cylinder connected to and operating in synchronism with the primary supply means for the transfer of batches of pasty material to the feed cylinder, in combination, a feed piston accommodated in the feed cylinder and comprising a piston rod; and reciprocating means for moving said feed piston between two end positions so that the piston alternatively performs working and return strokes, said reciprocating means comprising a fixed shaft, an elongated carriage arranged to rock about the axis of said fixed shaft, rocking means for moving said carriage back and forth about the axis of said fixed shaft, connecting means for adjustably coupling said piston rod with said carriage so that the feed piston reciprocates in response to rocking of said carriage, said connecting means comprising an adjusting member supported by said carriage and operatively connected with said piston rod, and shifting means for moving said adjusting member toward and away from the axis of said fixed shaft so that the stroke of said feed piston changes in response to changes in distance between said adjusting member and said fixed shaft, said elongated carriage being arranged so that its longitudinal extension lies in a plane which is substantially perpendicular to the axis of said piston rod when said feed piston is moved to one of said end positions 2. In a sausage stuffing machine of the type including primary supply means and a feed cylinder connected to and operating in synchronism with the primary supply means for the transfer of batches of pasty material to the feed cylinder, in combination, a feed piston accommodated in the feed cylinder and comprising a piston rod; and reciprocating means for moving said feed piston between two end positions so that the piston alternatively performs working and return strokes, said reciprocating means comprising a fixed shaft, a carriage arranged to rock about the axis of said fixed shaft, rocking means for moving said carriage back and forth about the axis of said fixed shaft comprising a motor-driven eccentric coupling rod and pivot means connecting said coupling rod to said carriage at a point spaced from said fixed shaft, connecting means for adjustably coupling said piston rod with said carriage so that the feed piston reciprocates in response to rocking of said carriage, said connecting means comprising an adjusting member supported by said carriage and operatively connected with said piston rod, and shifting means for moving said adjusting member between said pivot means and said fixed shaft so that the stroke of said feed piston increases in response to increasing distance between said adjusting member and said fixed shaft, the axes of said pivot means and of said fixed shaft being located in a plane which is substantially perpendicular to the axis of said piston rod when the feed piston is moved to one of said end positions.

3. A combination as set forth in claim 2, wherein said plane is substantially perpendicular to the axis of said piston rod when the feed piston completes a working stroke.

4. In a sausage stuffing machine of the type including primary supply means and a feed cylinder connected to and operating in synchronism with the primary supply means for the transfer of batches of pasty material to the feed cylinder, in combination, a feed piston accommodated in the feed cylinder and comprising a piston rod; and reciprcoating means for moving said feed piston between two end positions so that the piston alternatively performs working and return strokes, said reciprocating means comprising a fixed shaft having an axis which is perpendicular to the axis of said piston rod, an elongated carriage arranged to rock about the axis of said fixed shaft, rocking means for moving said carriage back and forth through equal distances and including a motor having an output shaft, an eccentric coupling rod driven by said output shaft, and a pivot having an axis parallel with the axis of said fixed shaft and arranged to connect one end of said coupling rod with said carriage at a point distant from said fixed shaft so that the carriage is rocked in response to rotation of said output shaft, connecting means for adjustably coupling said piston rod with said carriage so that said feed piston reciprocates in response to rocking of the carriage, said connecting means comprising a push rod articulately connected with said piston rod and an adjusting member connected with said push rod and supported by said carriage, and shifting means mounted on said carriage and arranged to move said adjusting member between said fixed shaft and said pivot whereby the stroke of said feed piston is shortened when the adjusting member is moved toward said fixed shaft, the axes of said fixed shaft and said pivot being located in a common plane which is substantially perpendicular to the axis of said piston rod when the feed piston completes a working stroke.

5. In a sausage stuffing machine of the type including primary supply means and a feed cylinder connected to and operating in synchronism with the primary supply means for the transfer of batches of pasty material to the feed cylinder, in combination, a feed piston accommodated in the feed cylinder and comprising a piston rod; and reciprocating means for moving said feed piston between two end positions so that the piston alternatively performs working and return strokes, said reciprocating means comprising a fixed shaft having an axis which is perpendicular to the axis of said piston rod, an elongated carriage arranged to rock about the axis of said fixed shaft, rocking means for moving said carriage back and forth through equal distances and comprising a pivot having an axis parallel with the axis of said fixed shaft, connecting means for adjustably coupling said piston rod with said carriage so that said feed piston reciprocates in response to rocking of the carriage, said connecting means comprising a push rod articulately connected with said piston rod and an adjusting member connected with said push rod and supported by said carriage, and shifting means mounted on said carriage and arranged to move said adjusting member between said fixed shaft and said pivot whereby the stroke of said feed piston is shortened when the adjustng member is moved toward said fixed shaft, the axes of said fixed shaft and said pivot being located in a common plane which is substantially perpendicular to the axis of said piston rod when the feed piston completes a working stroke.

6. In a sausage stuffing machine of the type including primary supply means and a feed cylinder connected to and operating in synchronism with the primary supply means for the transfer of batches of pasty material to the feed cylinder, in combination, a feed piston accommodated in the feed cylinder and comprising a piston rod; and reciprocating means for moving said feed piston between two end positions so that the piston alternatively performs working and return strokes, said reciprocating means comprising a fixed shaft having an axis which is perpendicular to the axis of said piston rod, an elongated carriage arranged to rock about the axis of said fixed shaft, rocking means for moving said carriage back and forth through equal distances and including a pivot secured to said carriage and having an axis parallel with the axis of said fixed shaft, connecting means for adjustably coupling said piston rod with said carriage so that said feed piston reciprocates in response to rocking of the carriage, said connecting means comprising an elongated push rod, first pin means articulately connecting one end of said push rod to said piston rod, second pin means provided at the other end of said push rod, and an adjusting member connected with said second pin means and supported by said carriage, and shifting means mounted on said carriage and arranged to move said adjusting member between said fixed shaft and said pivot whereby the stroke of said feed piston is shortened when the adjusting member is moved toward said fixed shaft, the axes of said fixed shaft and said pivot being located in a common plane which is substantially perpendicular to the axis of said piston rod when the feed piston completes a working stroke, the distance between said first and second pin means being at least equal to the distance through which said adjusting member is movable toward or away from said fixed shaft.

7. A combination as set forth in claim 6, wherein the axis of said second pin means is located in said common plane intermediate said pivot and said fixed shaft and wherein the axis of said second pin means remains in said common plane when said adjusting member is moved with reference to said carriage.

8. In a sausage stuffing machine of the type including primary supply means and a feed cylinder connected to and operating in synchronism with the primary supply means for the transfer of batches of pasty material to the feed cylinder, in combination, a feed piston accommodated in the feed cylinder and comprising a piston rod; and reciprocating means for moving said feed piston between two end positions so that the piston alternatively performs working and return strokes, said reciprocating means comprising a fixed shaft, a carriage arranged to rock about the axis of said fixed shaft, rocking means for moving said carriage back and forth about the axis of said fixed shaft, connecting means for adjustably coupling said piston rod with said carriage so that the feed piston reciprocates in response to rocking of said carriage, said connecting means comprising a spindle nut supported by said carriage and operatively connected with said piston rod, and shifting means for moving said spindle nut toward and away from the axis of said fixed shaft so that the stroke of said feed piston changes in response to changes in distance between said spindle nut and said fixed shaft, said elongated carriage being arranged so that its longitudinal extension lies in a plane which is substantially perpendicular to the axis of said piston rod when said feed piston is moved to one of said end positions, said shifting means comprising a self-locking spindle meshing with said spindle nut and extending radially of said fixed shaft, and means for rotating said spindle.

9. A combination as set forth in claim 8, wherein said carriage comprises elongated guide means and said spindle nut is reciprocable in said guide means in response to rotation of said spindle.

10. A combination as set forth in claim 8, wherein the means for rotating said spindle comprises actuating means and a transmission operatively connecting said actuating means with said spindle.

11. A combination as set forth in claim 10, further comprising adjustable indicator means for indicating the length of strokes of said piston, and transmission means connecting said actuating means with said indicator means so that the indicator means is adjusted automatically when said actuating means rotates said spindle.

12. In a machine for stuffing batches of pasty material into tubular skins to form sausages and for twisting the skin at predetermined intervals to form links which seal the trailing ends of freshly formed sausages, in combination, a feed cylinder; a feed piston reciprocably received in said cylinder and comprising a piston rod; a source of pasty material connected with said feed cylinder; reciprocating means for moving said feed piston between two end positions so that the piston alternatively performs working and return strokes to respectively expel a measured quantity of pasty material from said feed cylinder and to draw a measured quantity of pasty material from said source and into said feed cylinder, said reciprocating means comprising a fixed shaft, an elongated carriage arranged to rock back and forth through equal distances about the axis of said fixed shaft, means for rocking said carriage, connecting means for adjustably coupling said piston rod with said carriage so that the feed piston reciprocates in response to rocking of said carriage, said connecting means comprising an adjusting member supported by said carriage and operatively connected with said piston rod, and shifting means for moving said adjusting member toward and away from the axis of said fixed shaft so that the stroke of said feed piston changes in response to changes in distance between said adjusting member and said fixed shaft, said elongated carriage being arranged so that its longitudinal extension lies in a plane which is substantially perpendicular to the axis of said piston rod when said feed piston is moved to one of said end positions; a tubular conveying member connected with said feed cylinder and arranged to support a length of skin and to deliver into the skin a measured quantity of pasty material during each working stroke of said feed piston; and means for rotating said conveying member in response to rocking of said carriage when the feed piston performs a return stroke so that the conveying member rotates the skin and forms a link at the trailing end of each freshly formed sausage.

13. A combination as set forth in claim 12, wherein the means for rotation said conveying member comprises one-way clutch means so that said conveying member is rotated in a single direction.

14. A combination as set forth in claim 13, wherein the means for rotating said conveying member comprises a transmission including a first wheel coaxial with said conveying member, a second wheel, an endless flexible member trained around said wheels, a toothed segment fixed to said carriage and having a pitch circle whose center is located on the axis of said fixed shaft, and a pinion driven by said segment and arranged to rotate said second wheel.

15. A combination as set forth in claim 14, wherein said one-way clutch means is arranged to rotate said second wheel in response to rotation of said pinion in one direction.

16. A combination as set forth in claim 14, wherein said conveying member is a spout and further comprising a rotary nozzle communicatively connected with said spout arranged to rotate with said first wheel, said nozzle being arranged to receive pasty material from said feed cylinder.

17. A combination as set forth in claim 14, wherein said wheels are sprocket wheels and wherein said flexible element is a chain.

18. In a machine for stuffing batches of pasty material into tubular skins to form sausages and for twisting the skin at predetermined intervals to form links which seal the trailing ends of freshly formed sausages, in combination, a feed cylinder; a feed piston reciprocably received in said cylinder and comprising a piston rod; a source of pasty material connected with said feed cylinder; reciprocating means for moving said feed piston between two end positions so that the piston alternatively performs working and return strokes to respectively expel a measured quantity of pasty material from said feed cylinder and to draw a measured quantity of pasty material from said source and into said feed cylinder, said reciprocating means comprising a fixed shaft, an elongated carriage arranged to rock back and forth through equal distances about the axis of said fixed shaft, means for rocking said carriage, and means for coupling said piston rod with said carriage so that the feed piston reciprocates in response to rocking of the carriage, said elongated carriage being arranged so that its longitudinal extension lies in a plane which is substantially perpendicular to the axis of said piston rod when said feed piston is moved to one of said end positions; a tubular conveying member communicating with said feed cylinder and arranged to support a length of skin and to deliver into the skin a measured quantity of pasty material during each working stroke of said feed piston; and means for rotating said conveying member in response to rocking of said carriage when the feed piston performs a return stroke so that the conveying member rotates the skin and forms a link at the trailing end of each freshly formed sausage.

19. In a sausage stuffing machine of the type including primary supply means and a feed cylinder connected to and operating in synchronism with the primary supply means for the transfer of batches of pasty material to the feed cylinder, in combination, a feed piston accommodated in the feed cylinder and comprising a piston rod; and reciprocating means for moving said feed piston between two end positions so that the piston alternatively performs working and return strokes, said reciprocating means comprising a fixed shaft, an elongated carriage arranged to rock about the axis of said fixed shaft, rocking means for moving said carriage back and forth about the axis of said fixed shaft, and connecting means for adjustably coupling said piston rod with said carriage in any one of a plurality of positions of said piston rod along said carriage in the direction of elongation thereof and each at a different distance from the axis of said fixed shaft so that the feed piston reciprocates in response to rocking of said carriage and the stroke of said piston changes in response to changes in the position of said piston rod along said elongated carriage, said elongated carriage being arranged to extend substantially in a plane which is substantially perpendicular to the axis of said piston rod when the feed piston is moved to one of said two end positions.

References Cited by the Examiner
UNITED STATES PATENTS

| | | | |
|---|---|---|---|
| 2,281,777 | 5/1942 | Madsen et al. | 74—40 |
| 2,830,455 | 4/1958 | Harmon | 74—40 |
| 2,841,991 | 7/1958 | Saalfrank | 74—40 |
| 2,997,888 | 8/1961 | Rust | 74—40 X |

FOREIGN PATENTS

| | | |
|---|---|---|
| 606,685 | 12/1934 | Germany. |
| 901,578 | 7/1962 | Great Britain. |

SAMUEL KOREN, *Primary Examiner.*

LUCIE H. LAUDENSLAGER, *Examiner.*